(12) United States Patent
McKinney et al.

(10) Patent No.: US 8,214,304 B2
(45) Date of Patent: Jul. 3, 2012

(54) METHOD AND DEVICE FOR CALCULATING A SIMILARITY METRIC BETWEEN A FIRST FEATURE VECTOR AND A SECOND FEATURE VECTOR

(75) Inventors: Martin Franciscus McKinney, Eindhoven (NL); Dirk Jeroen Breebaart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1036 days.

(21) Appl. No.: 12/090,360

(22) PCT Filed: Oct. 16, 2006

(86) PCT No.: PCT/IB2006/053788
§ 371 (c)(1),
(2), (4) Date: Apr. 16, 2008

(87) PCT Pub. No.: WO2007/046049
PCT Pub. Date: Apr. 26, 2007

(65) Prior Publication Data
US 2008/0281895 A1 Nov. 13, 2008

(30) Foreign Application Priority Data
Oct. 17, 2005 (EP) ..................................... 05109636

(51) Int. Cl.
*G06F 11/00* (2006.01)
(52) U.S. Cl. ........................................................ 706/12
(58) Field of Classification Search .................... 706/12, 706/45–47; 375/240
See application file for complete search history.

(56) References Cited

U.S. PATENT DOCUMENTS

| | | | |
|---|---|---|---|
| 5,930,749 A * | 7/1999 | Maes | 704/228 |
| 5,982,903 A * | 11/1999 | Kinoshita et al. | 381/18 |
| 6,173,275 B1 * | 1/2001 | Caid et al. | 706/14 |
| 2003/0110181 A1 * | 6/2003 | Schuetze et al. | 707/103 R |
| 2004/0133927 A1 * | 7/2004 | Sternberg et al. | 725/136 |
| 2005/0216426 A1 * | 9/2005 | Weston et al. | 706/12 |
| 2006/0067573 A1 * | 3/2006 | Parr et al. | 382/154 |

FOREIGN PATENT DOCUMENTS
WO WO2004095315 A1 11/2004

OTHER PUBLICATIONS

Kwon et al: "Speaker Change Detection Using a New Weighted Distance Measure"; ICSLP 2002: 7th International Conference on Spoken Language Processing, Denver, CO, Sep. 16-20, 2002, International Conference on Spoken Language Processing, ICSLP, Adelaide, Australia, Causal Productions, vol. 4, Sep. 16, 2002, pp. 2537-2540.
Otsu, N: "A Threshold Selection Method From Gray-Level Histograms"; IEEE Transactions on Systems, Man, and Cybernetics, IEEE, New York, NY, vol. 9, No. 1, 1979, pp. 62-66.

* cited by examiner

*Primary Examiner* — David Vincent

(57) ABSTRACT

The method of calculating a similarity metric between a first feature vector of a first audio and/or video signal and a second feature vector of a second audio and/or video signal of the invention comprises the step of calculating a distance between the first feature vector and the second feature vector, both the first feature vector and the second feature vector comprising a feature value of a second dimension, wherein a weighting factor is used that gives a stronger weight to the first dimension than to the second dimension. The electronic device of the invention comprises electronic circuitry, which is operative to perform the method of the invention. The software of the invention makes a programmable device operative to perform the method of the invention.

5 Claims, 1 Drawing Sheet

$$D = (\mu_1 - \mu_2) \bullet W \bullet (\mu_1 - \mu_2)^T \quad (1)$$

$$W = \overline{gw} \bullet C^{-1} \bullet \overline{gw'} \quad (2)$$

$$\overline{gw} = \sqrt{\left|\frac{\sigma_{\mu_g}^{-2}}{\sigma_f^{-2}}\right|} \quad (3)$$

METHOD AND DEVICE FOR CALCULATING A SIMILARITY METRIC BETWEEN A FIRST FEATURE VECTOR AND A SECOND FEATURE VECTOR

The invention relates to a method of calculating a similarity metric between a first feature vector of a first audio and/or video signal and a second feature vector of a second audio and/or video signal.

The invention further relates to an electronic device for calculating a similarity metric between a first feature vector of a first audio and/or video signal and a second feature vector of a second audio and/or video signal.

The invention also relates to software for making a programmable device operative to perform a method of calculating a similarity metric between first feature vector of a first audio and/or video signal and a second feature vector of a second audio and/or video signal.

An embodiment of this method is known from WO2004/095315. The known method for finding similar audio signals has the drawback that the calculated similarity metric is not optimal in the sense that either not all similar audio signals are found or not all audio signals determined to be similar are sufficiently similar.

It is a first object of the invention to provide a method of the type described in the opening paragraph, which provides a more accurate similarity metric calculation.

It is a second object of the invention to provide an electronic device of the type described in the opening paragraph, which provides a more accurate similarity metric calculation.

According to the invention, the first object is realized in that the method comprises the step of calculating a distance between the first feature vector and the second feature vector, both the first feature vector and the second feature vector comprising a feature value of a second dimension, wherein a weighting factor is used that gives a stronger weight to the first dimension than to the second dimension. Experiments have shown that a more accurate similarity metric calculation can be obtained by giving a stronger weight to certain dimensions (features), especially those dimensions that are important for (music) classification.

The audio and/or video signal can originate from any suitable source. Most generally, an audio signal might originate from an audio file, which may have any one of a number of formats. Examples of audio file formats are uncompressed, e.g. (WAV), lossless compressed, e.g. Windows Media Audio (WMA), and lossy compressed formats such as MP3 (MPEG-1 Audio Layer 3) file, AAC (Advanced Audio Codec), etc. Equally, the audio input signal can be obtained by digitizing an audio signal using any suitable technique, which will be known to a person skilled in the art.

In an embodiment of the method of the invention, the weighting factor of a specific one of the features depends on the variance in value of the specific one feature for a collection of signals (i.e. the overall variance of all values of all classes in a dimension) and/or on the variance in mean value of the specific one feature per class of signals (i.e. the variance of a plurality of mean values in a dimension, the mean values being determined per class). In this way, those dimensions that are important for (music) classification are given a stronger weight. The variances may be calculated in a multi-dimensional space. The collection of signals may be a collection owned by a company or organization or a personal collection. If the collection of signals is a collection owned by a company or organization, the weighting factor may be pre-configured in hardware or in software or may be obtainable from the company or organization via the Internet.

The weighting factor may depend on the variance in mean value of the specific one feature per class of signals divided by the variance in value of the specific one feature for a collection of signals.

The weighting factor may depend on a classification (e.g. genre, mood and/or artist) of the first or second audio and/or video signal. The classification may be retrieved, for example, from an ID3 tag of an audio file. For example, the weighted covariance matrix used when a user selects a rock song as seed song may be different from the weighted covariance matrix used when he selects a piece of classical music as seed song.

According to the invention, the second object is realized in that the electronic device comprising electronic circuitry, the electronic circuitry being operative to calculate a distance between the first feature vector and the second feature vector, both the first feature vector and the second feature vector comprising a feature value of a second dimension, wherein a weighting factor is used that gives a stronger weight to the first dimension than to the second dimension.

These and other aspects of the invention are apparent from and will be further elucidated, by way of example, with reference to the drawings, in which.

Corresponding elements in the drawings are denoted by the same reference numeral.

Figures 1, 2:
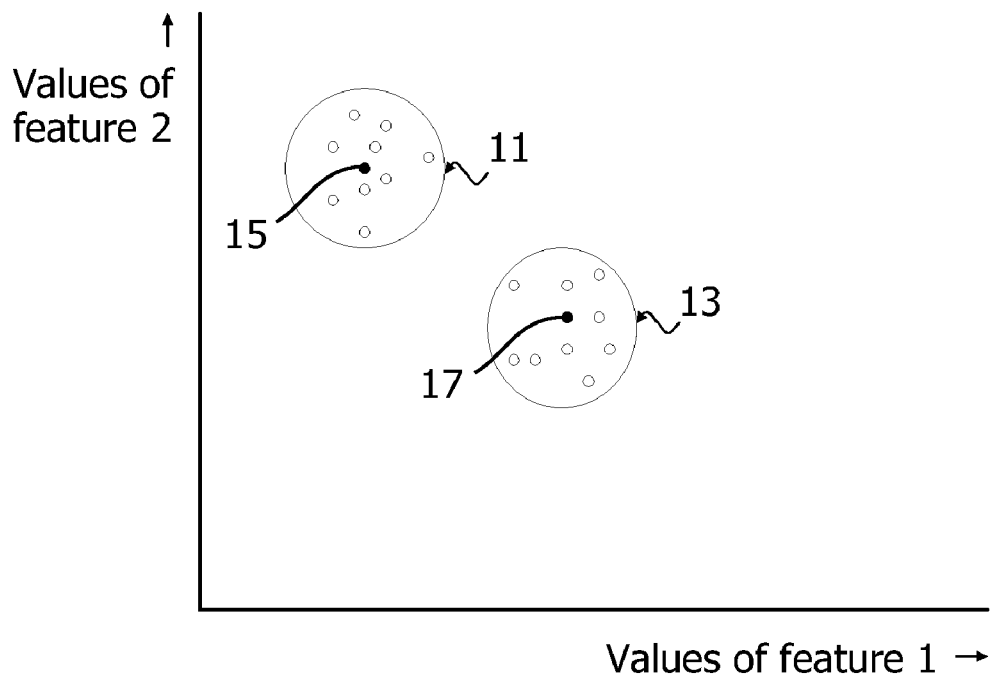
FIG. 1 shows three equations used in an embodiment of the invention.
FIG. 2 shows examples of feature values in a two-dimensional feature space in which the feature values can be classified into two genres.

The method of the invention can be used for finding music similar to a target song or the current playing selection. For example, if a listener has a large collection of music and is listening to a track that he especially likes, he could simply press a button that would initiate a search through the whole collection of music and return a list of the most similar songs and then cue them up for playback. Such a function is referred to as LikeMusic™ in certain Philips consumer devices. This function is envisioned on portable mp3 players, car radios, and home entertainment systems and is applicable to large local collections of music, streamed music and audio, as well as broadcast music and audio. In addition, users could listen to the radio and have the button search for similar songs in their private collection or vice versa. The LikeMusic™ algorithm operates on features (signal statistics) that are automatically extracted from the audio waveform itself, so no external or annotated metadata is necessary. The first LikeMusic™ algorithm used a standard statistical distance measure (Mahalanobis distance) to calculate the distances between songs.

Since music similarity can be described along multiple dimensions, it is often of interest to isolate a specific dimension of similarity. The method of the invention provides an efficient manner for calculating the similarity distance from acoustic parameters along a specific perceptual similarity dimension by modifying the first LikeMusic™ algorithm to weight the feature dimensions that are important for music classification. The weighting of feature dimensions could be based, for example, on genre, artist and/or mood classification.

In an embodiment of the method of the invention, the method first extracts features (descriptive audio signal statistics) from each song and generates a listing with each track name and associated features. The features could come from a wide range of statistics. On a modern PC, these features are extracted several hundred times real-time. When a song is being played, the method could extract features from that song in real-time or look it up in the database listing if it comes from the database. The difference between these approaches is that the features listed in the database are averaged over the whole song while features being extracted in real-time represent only a section of the song (these could accumulate for a specified amount of time and then be averaged over that time). Both methods have pros and cons that depend on the type of music being analyzed: (e.g., if a song contains a variety of styles and one is interested in only one of these particular styles, then for that purpose, a local analysis is better than one averaged over the whole song). In most cases, however, the style of the song does not vary much and both methods deliver the same results.

The recommendation procedure performed automatically or by the press of a button, would either lookup or calculate the features of the currently playing selection, calculate a distance measure, D, between the current song and every song in the database, and then recommend the closest 20 songs. The user could adjust the number of songs recommended and the system could automatically cue and play the recommended (similar) songs. The distance measure, D, is a modified form of the Mahalanobis distance between feature vectors in the multidimensional feature space with a weighting factor that gives a stronger weight to dimensions (features) that are important for music classification. This feature space is, for example, a 20 dimensional space.

The distance, D, between an audio track 1 and an audio track 2 can be calculated with equation (1) of FIG. 1, where $\mu_1$ and $\mu_2$ are the vectors of track 1 and 2 respectively and W is the weighted covariance matrix of the all of the feature vectors in the database. The weighted covariance matrix, W, is a constant that does not change from one recommendation to the next. It can be determined from a collection of audio tracks owned by a company or organization or it can be determined from a user's personal collection of audio tracks. W can be calculated with equation (2) of FIG. 1, where C is the covariance matrix of all features from a (e.g. training) database and gw is the genre weighting vector defined in equation (3) of FIG. 1, where $\overline{\sigma}_f^2$ is the vector of feature variances overall (the diagonal of the covariance matrix C, e.g. comprising the variances in feature values of genres 11 and 13 for feature 1 and the variances in feature values of genres 11 and 13 for feature 2, see FIG. 2) and $\overline{\sigma}_{\mu_g}^2$ is the vector of variances of mean feature values per genre (e.g. comprising the variance between mean feature value 15 of genre 11 and mean feature value 17 of genre 13 for feature 1 and the variance between mean feature value 15 of genre 11 and mean feature value 17 of genre 13 for feature 2, see FIG. 2). This same type of calculation could be performed for classes of music artist, music mood or personal music classes instead of music genre. Each variation would then calculate the distance along a different dimension of similarity.

The method may be performed in hardware or in software, e.g. on an application-specific processor or on a general purpose processor such as the Intel Pentium or AMD Athlon processor. The electronic device performing the method may be a portable device or a stationary device such as a media center PC/device.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Software' is to be understood to mean any software product stored on a computer-readable medium, such as a floppy disk, downloadable via a network, such as the Internet, or marketable in any other manner.

The invention claimed is:

1. A method performed by a processor of calculating a similarity metric between a first feature vector of a first audio and/or video signal and a second feature vector of a second audio and/or video signal, the method comprising acts of:
   calculating a weighting factor that depends on a variance in mean value of a specific one feature per class of signals divided by a variance in value of a specific one feature for a collection of signals; and
   calculating a distance between the first feature vector and the second feature vector, both the first feature vector and the second feature vector comprising a feature value of a second dimension, wherein the weighting factor that is selected gives a stronger weight to the first dimension than to the second dimension.

2. The method as claimed in claim 1, wherein the weighting factor depends on a classification of the first or second audio and/or video signal.

3. A method performed by a processor of calculating a weighting factor for a similarity metric between a first feature vector of a first audio and/or video signal and a second feature vector of a second audio and/or video signal the method comprising acts of
   calculating a factor of a specific one of a plurality of features based on a variance in value of a specific one feature for a collection of signals and/or on a variance in mean value of the specific one feature per class of signals;
   and calculating a weighting factor based on the calculated factor and the variance in mean value of the specific one feature per class of signals divided by the variance in value of the specific one feature for a collection of signals.

4. A program stored on a non-transitory memory medium for making a programmable device operative to perform a method of calculating a similarity metric between a first feature vector of a first audio and/or video signal and a second feature vector of a second audio and/or video signal, the method comprising acts of:
   calculating a weighting factor that depends on a variance in mean value of a specific one feature per class of signals divided by a variance in value of a specific one feature for a collection of signals; and
   calculating a distance between the first feature vector and the second feature vector, both the first feature vector and the second feature vector comprising a feature value of a second dimension, wherein the weighting factor is selected that provides a stronger weight to the first dimension than to the second dimension.

5. An electronic device for calculating a similarity metric between a first feature vector and a second feature vector of an audio and/or video signal, the electronic device comprising electronic circuitry, the electronic circuitry being operative to:
  calculate a weighting factor that depends on a variance in mean value of a specific one feature per class of signals divided by a variance in value of a specific one feature for a collection of signals; and
  calculate a distance between the first feature vector and the second feature vector, both the first feature vector and the second feature vector comprising a feature value of a second dimension, wherein the weighting factor is selected that gives a stronger weight to the first dimension than to the second dimension.

* * * * *